United States Patent [19]
Silverman et al.

[11] 3,979,724
[45] Sept. 7, 1976

[54] SEISMIC METHOD FOR DETERMINING THE POSITION OF THE BOTTOM OF A LONG PIPE IN A DEEP BOREHOLE

[76] Inventors: Daniel Silverman, 5969 S. Birmingham; John R. Bailey, 3169 E. 38 Place, both of Tulsa, Okla. 74105

[22] Filed: June 3, 1974

[21] Appl. No.: 475,581

[52] U.S. Cl. ............... 340/15.5 BH; 175/1; 175/40; 181/102; 181/106; 181/120; 181/119; 340/15.5 MC; 340/18 NC; 340/18 R
[51] Int. Cl.² ............................ G01V 1/40
[58] Field of Search ........... 181/102, 118, 116, 120, 181/106; 340/18 NC, 18 DC, 15.5 MC, 15.5 BH; 175/1, 40, 45, 237; 73/151; 166/308

[56] References Cited
UNITED STATES PATENTS

| | | | |
|---|---|---|---|
| 2,281,751 | 5/1942 | Cloud | 175/1 |
| 2,770,312 | 11/1956 | Silverman | 181/106 |
| 2,898,084 | 8/1959 | Eckel et al. | 175/1 |
| 2,933,144 | 4/1960 | Scott et al. | 340/18 LD |
| 3,055,450 | 9/1962 | Richards | 181/118 |
| 3,058,540 | 10/1962 | Simpson | 181/118 |
| 3,268,859 | 8/1966 | Watts | 340/15.5 MC |
| 3,427,652 | 2/1969 | Seay | 166/308 |
| 3,739,871 | 6/1973 | Bailey | 175/1 |
| 3,817,345 | 6/1974 | Bailey | 340/15.5 MC |

*Primary Examiner*—Howard A. Birmiel
*Attorney, Agent, or Firm*—Head, Johnson & Chafin

[57] ABSTRACT

A method and apparatus for determining the position of the bottom end of a long pipe in a deep water-filled borehole, comprising generating a shock wave in the water at the surface end of the pipe, timing the travel of the shock wave down the pipe to the bottom end thereof, where the shock wave will pass into the liquid in the borehole, generating an expanding seismic wave in the earth. Setting out a plurality of geophones on the earth at the surface to detect the arrival of the seismic wave. Recording the geophone signals and determining the arrival times of the seismic wave. Determining the travel times of the seismic wave to each geophone and determining the position of the end of the pipe.

16 Claims, 7 Drawing Figures

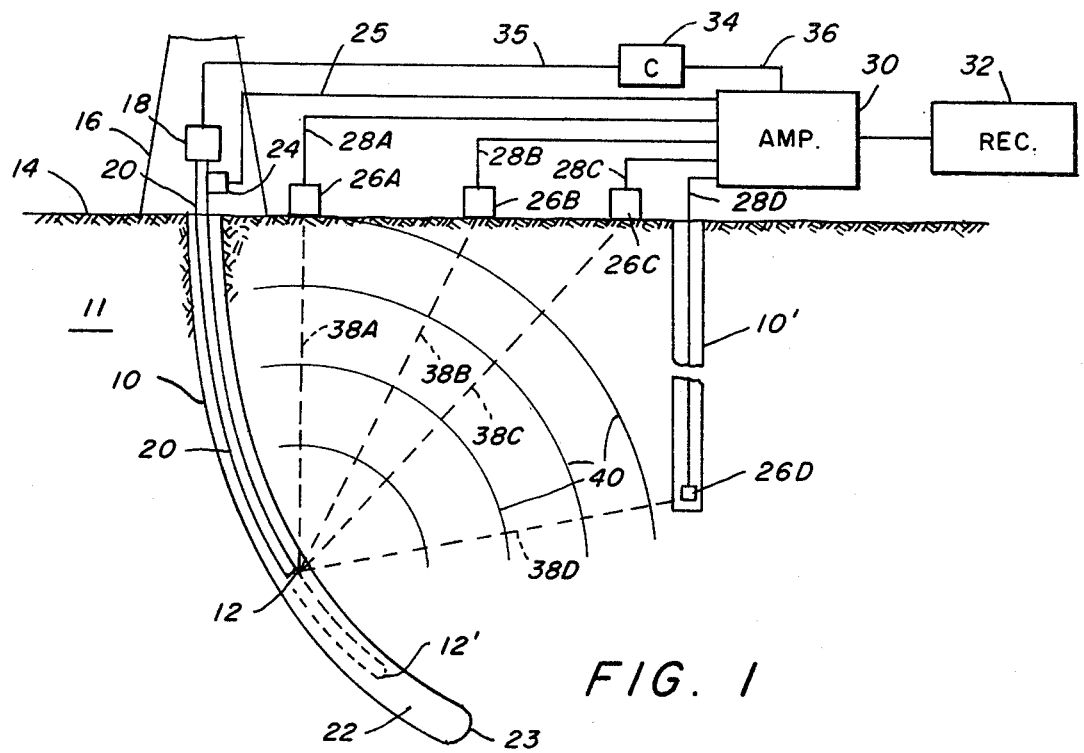
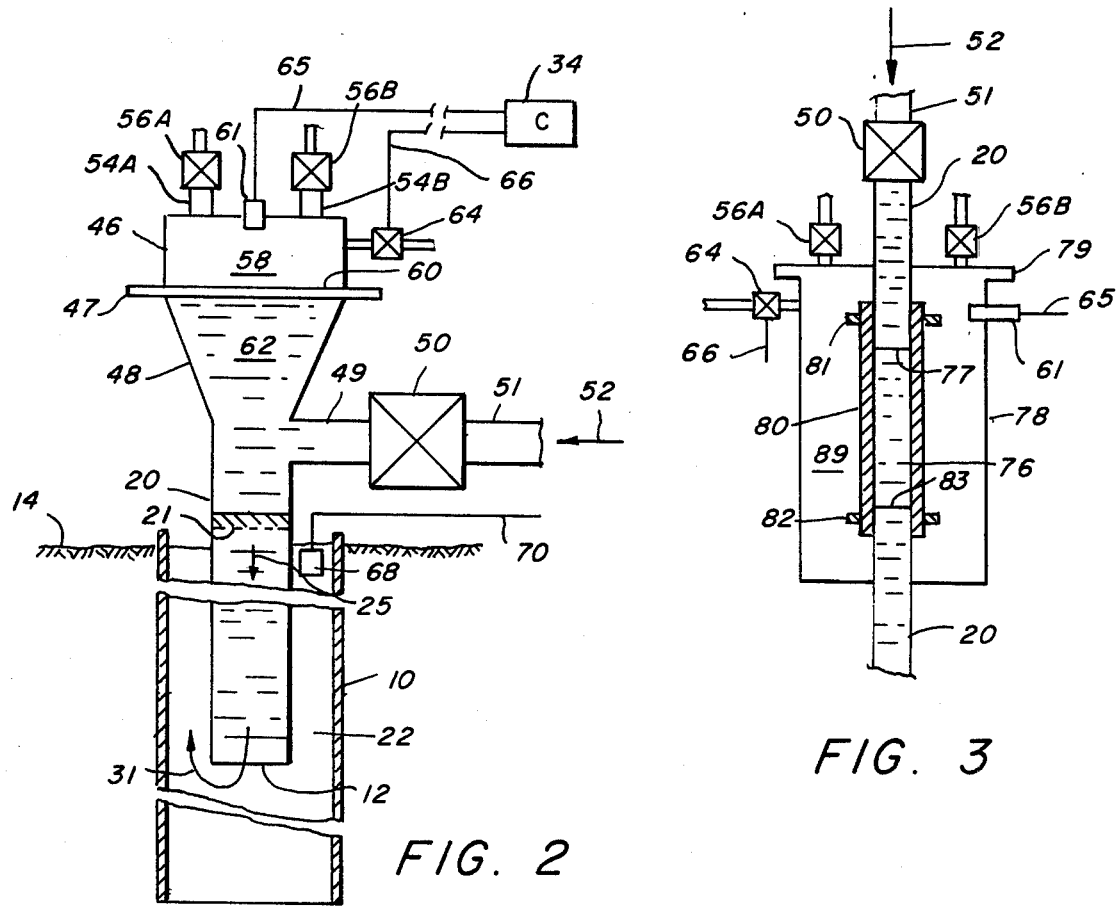
FIG. 1
FIG. 2
FIG. 3

SEISMIC METHOD FOR DETERMINING THE POSITION OF THE BOTTOM OF A LONG PIPE IN A DEEP BOREHOLE

CROSS REFERENCES TO RELATED APPLICATIONS

This application is related to the co-pending application of one of us, Ser. No. 371,142, now U.S. Pat. No. 3,817,345, entitled "Continuous Bit Positioning System", which is hereby entered into this application by reference. It is also related to U.S. Pat. No. 3,739,871, entitled "Mapping of Earth Fracture Induced by Hydrafracturing," which is hereby entered into this application by reference.

This application is also related to two other applications by the same inventors as this application and filed in the Patent Office on the same date as this application, entitled "Seismic Method for Logging Position of a Deep Borehole in the Earth," Ser. No. 475,587 and "Seismic Method for Determining Position of the Bit on a Drill Stem in a Deep Borehole" Ser. No. 475,590.

BACKGROUND OF THE INVENTION

This invention lies in the field of elastic wave generation and reception in the earth. More particularly, it is concerned with the determination of the position in three dimensions of the point at which an elastic wave is generated in the earth.

Still more particularly, it concerns the generation of a seismic wave at the bottom of a long liquid filled pipe in a deep borehole in the earth, receiving the seismic wave at a plurality of sensors in the earth, and determining the position of the bottom of the pipe.

Alternatively, the invention is concerned with initiation of a seismic wave at a selected shallow depth in a water layer overlaying the earth's surface for the purpose of determining the geologic structure of the earth to a selected depth below the water-earth interface.

In the prior art, various means have been devised for determining the position of a borehole in North-South, East-West coordinates, at selected depths during a drilling operation. This has been done by using survey instruments specially designed for introduction into the borehole, and sometimes introduced through the drill pipe, which, by their internal mechanism make a record of the slope, (or angle with the vertical) of the borehole at each of a plurality of selected depths, and a measure, in relation to the magnetic compass, of the azimuth of the slope of the borehole. Knowing the direction of slope, and magnitude of slope, at each of a plurality of selected known depths, and assuming that the borehole is straight in between the survey points at which measurements are made, the profile of the borehole in three dimensions can be determined.

A principal disadvantage of this particular system is that it requires a stoppage of the drilling process so that the drill pipe can be broken and the survey instrument inserted by a wire line into the drill pipe. Since the cost of operation of the drill rig runs into many thousands of dollars a day, time lost from the drilling operation, to make these measurements, is extremely expensive. There is understandable reluctance on the part of drillers to make these necessary measurements, so that at some future time, when this knowledge is needed, it will not be available and cannot be easily obtained.

SUMMARY OF THE INVENTION

It is a primary object of this invention to provide a simple and inexpensive means for determining, at any selected time, a measurement indicative of the position of the bottom of a long pipe in a borehole. This may be the position of the bottom of the borehole during a drilling operation.

It is an alternative object of this invention to provide a method and apparatus for generating a spherically expanding seismic wave at a selected point in a body of water in or over, the earth, for the purpose of receiving selected seismic wave reflections from geologic interfaces in the earth, by detecting and recording at the surface, reflected seismic waves from these interfaces.

These and other objects are realized and the limitations of the prior art are overcome in this invention by using the rotary drill pipe leading from the surface of the earth, as a water-filled shock tube, to the bottom of the drilled hole. A shock wave is initiated in the drill pipe, or above the swivel, by means of an explosive pressure pulse from an explosion of solid or gaseous explosive material, or by breaking of a frangible elements in a high pressure liquid line, or other means. This can be done while the drilling proceeds. However, it is possible to make these measurements during a time that a length of drill pipe is being added to the drill string. In this way the drill bit at the bottom of the string can be positioned successively at various positions above and at the bottom of the hole.

A chamber is provided at the top of the drill pipe, opening into the drill pipe, or with a flexible sleeve or boot surrounding the mud at the pipe. A high pressure shock wave is initiated in the chamber which is communicated to the mud surface, and a shock wave travels down the drill pipe to the bit and is expanded into the mud in the hole, and into the earth.

A plurality of geophones are positioned on the earth in a multi-dimensional array to detect the seismic wave originating at the bit. The time of initiation of the seismic wave is determined from the time of the generation of the shock waves at the surface and the time of travel of the shock wave in the pipe, knowing the length of the pipe. Alternatively, a reflected shock wave from the bit will travel up to the surface through the mud, so the round trip travel time can be measured from which the one-way time can be determined. Or the elastic wave which will travel from the bit up the metal of the pipe can be detected. Or the elastic wave in the mud in the annulus can be detected after reaching the surface.

In the case of off-shore seismic operation, the pipe would be much shorter in length, of the order of 50–100 feet, and would be held at a constant depth.

Instead of the single shock pulse of pressure applied to the liquid filled pipe, or the generating of a single shock wave, a time-pattern of shock waves can be generated, having a random time pattern. The received signals will carry this same time pattern and can be timed by cross correlation with this pulse time pattern to provide a more reliable determination of travel time. Of course, repeated operations can be carried out and the successive records can be stacked to provide a more reliable determination as is well known in the art.

While we speak of a drilled hole in the earth, and drill pipe, and bit, our apparatus can be any suitable pipe or conduit filled with any suitable liquid, in any body of liquid including an open body of liquid over the earth's surface such as a lake, bay or ocean. Thus, the pipe can be drill pipe or tubing, or any other rigid conduit, and may be a long pipe coiled on a drum.

Also while we discuss the process in terms of the drilling of a borehole in the earth, the method can equally well be used in an open hole, after the drilling is complete.

Also, while we speak of a shock pulse initiating the shock wave, it can be positive or negative pressure.

Also, while we speak of geophones recording the arrival of the elastic wave at the surface the sensors can be of any type such as pressure, acceleration, velocity, displacement, electrodynamic, capacitive, resistive or other type, etc.

BRIEF DESCRIPTION OF THE DRAWINGS

These and other objects and advantages of this invention and a better understanding of the principles and details of the invention will be evident from the following description taken in conjunction with the appended drawings in which:

FIG. 1 illustrates in vertical section, the application of this invention to determining the shape of a borehole in the earth.

FIG. 2 indicates an apparatus for creating a shock wave in a liquid filled pipe by the explosion of a combustible gas-oxygen mixture.

FIG. 3 illustrates another form of apparatus for generating a shock wave by means of an explosive gas mixture.

DESCRIPTION OF THE PREFERRED EMBODIMENT

Figure 6:
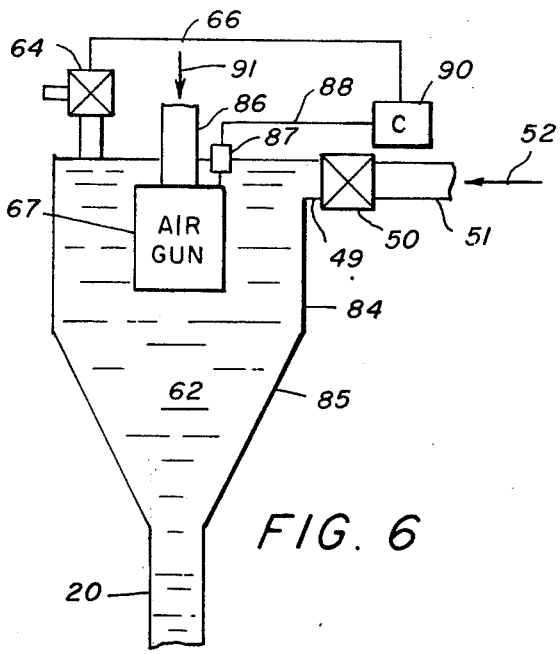
FIG. 6 illustrates apparatus for generating a shock wave in liquid-filled pipe by means of an air gun.

Referring now to the drawings and in particular to FIG. 1 there is illustrated in schematic form a cross-section of the earth 11 with a deep borehole 10 drilled in the earth from the surface 14 down to the bottom of the borehole 23. In general, the borehole will not be straight and one of the primary purposes of this invention is to be able to map the true position of the borehole in X and Y coordinates at any selected depth. There is a long pipe 20 inserted into the borehole and extending from the surface down to a point 12 where the pipe is terminated with an open end. At the surface there is a chamber 18 which will be described more fully in connection with the other figures, in which a shock-wave can be generated in the liquid in the pipe 20, which shock wave will travel down the liquid in the pipe until it reaches the open mouth of the pipe at point 12, where it will generate an elastic wave, or seismic wave, in the earth as an expanding spherical surface about the point 12, illustrated by the circles 40.

Along the surface of the earth, and at various points within the earth there are a plurality of geophones or other detectors of ground motion, 26A, 26B, 26C, 26D, etc., each of which is connected by an appropriate cable 28A, 28B, 28C, 28D, etc. to a multi-channel amplifier 30, where the signals generated by the geophones are amplified and sent to a recording means 32, which may be a photographic, magnetic, or other type of recorder. The geophones, amplifiers and recorder can be conventional devices.

A conventional tower 16 at the surface of the earth 14 is provided to support the pipe, by means not shown but very well understood in the art. The pipe 20 may be drill pipe or tubing or any other sort of thick walled conduit such as to provide a rigid wall for the passage of the shock wave through the pipe to a point at considerable depth in the earth. A sensor 24 is provided, which will be described in greater detail in other figures, which is of a nature well known in the art to sense the passage in the pipe of an elastic compressional wave set up at the open mouth 12 of the pipe 20 by the passage of the shock wave. This elastic wave will travel up the pipe at a known or determinable velocity so that by recording the time of arrival of the elastic wave at the sensor 24 and carrying the sensor output along the cable 25 to amplifier 30 and recorder 32, the precise time of arrival of the elastic wave can be determined. Knowing the length of pipe and the velocity of propagation of the elastic wave, the time of initiation of the seismic wave can be determined.

A control means 34 is provided to initiate the generation of the shock wave in the device 18 and the time at which it is initiated is carried to the amplifier by means 36, so that a signal will appear on the recording means 32 from which the time of initiation can be determined. This sort of recording of time functions and determining of precise time instances, is well known in the seismic art and need not be described any more fully at this time.

Knowning the time of initiation of the shock wave at device 18, and the known, or determinable, velocity of travel of the shock wave in the pipe 20, it is possible to determine the time of arrival of the mouth 12 of the pipe 20, which would be the time of initiation of the seismic wave 40.

There are several methods of determining the initiation time of the seismic wave; one is in terms of the time of arrival of the elastic wave up the pipe, which is initiated by the arrival of the shock wave at the mouth of the pipe. As will be illustrated in FIGS. 2 and 4, there are two other sensors that may be used to detect the elastic waves. One is used to detect the elastic wave that returns from the mouth 12 (after the arrival of the shock wave at the mouth) after it has traveled up the liquid in the pipe to the sensor at the surface. Another is a sensor in the mud in the annulus of the well, which is initiated by the arrival of the original shock wave at the mouth 12 of the pipe.

Knowing the length of pipe in the well and by the use of appropriate sensors at the surface, the instant of generation at the mouth 12 of the pipe, of the seismic wave 40 can be determined. Also the times of arrival of the wave 40 at each of the geophones can be determined from the record 32. Therefore, the individual travel times of the seismic wave along the cords 38A, 38B, 38C, 38D, etc., can be determined, and therefrom, and the known position in space of the geophones, the position in space of the mouth of the pipe can be determined.

There are a number of ways in which the shock wave can be generated in the liquid filled pipe at the surface of the earth. In FIG. 2 is shown a cross-section of the earth with a borehole. There is a long pipe 20 inserted into this deep borehole, which pipe may be a drill pipe, or tubing, or any other rigid walled conduit. At the surface there is a side pipe 49 joining the pipe 20, and a valve 50. Mud is flowed in the direction shown by the arrow 52 through the pipe 51, valve 50, pipe 49 into the vertical pipe 20, and as shown by the arrow 31 through the mouth 12 of the pipe and up the annulus between the pipe and the wall of the bore hole 10. There is a conical shaped chamber 48 at the upper end of the pipe 20, and means for clamping a flexible diaphragm 60 so that the mud or water flowed in through the valve 50 will completely fill the space 62 under the diaphragm 60. There is a chamber space 58 above the diaphragm and means are provided, including two inlet pipes 54A, 54B, two valves 56A, 56B, and means for flowing through one valve a combustible gas and through the other an oxygen containing gas, so that as they are mixed in the space 58 there will be a detonatable mixture. A spark plug, or other similar device 61, is provided so that by applying a suitable voltage on the line 65 a spark will pass and the gaseous mixture in the space 58 will detonate and create a shock force on the top of the diaphragm 60 which will be transmitted through the flexible diaphragm into the water or mud in the space 62 and the shock wave indicated by the shaded area 21 which is a very highly compressed section of the water will travel downward in accordance with the arrow 25 to the open mouth 12 of the pipe in the borehole. This sudden explosive force applied to the diaphragm is required to generate a shock wave which will travel within the rigid walls of the pipe at substantially constant intensity, until it gets to the mouth 12, where it will expand and exert a compressional shock force on the earth in the vicinity of the mouth 12, and will generate a seismic wave in the earth as illustrated in FIG. 1.

Shown in FIG. 2, is a valve 64 connecting the space 58 to the atmosphere and control line 66 from the control means 34. By this means it is possible, at a selected time after the explosion generating the shock force, to open the space 58 to the atmosphere, to vent the high pressure gas, so that soon thereafter the valve 64 can be closed again and the process repeated.

The valve 50 is provided since it is quite likely that this valve will be closed immediately prior to the firing of the explosive gas mixture in the space 58, so that the high pressure shock wave 21 will not be dissipated flowing outward through the pipe 51.

In FIG. 2 is also shown a sensor 68 which is suspended in the mud in the annulus 22 between the pipe and the wall of the borehole. Thus the shock wave which is generated at point 12 will pass as an elastic wave up through the mud in the annulus, in accordance with the arrow 31 and will be received at the sensor 68. From the arrival time of the elastic wave at the sensor 68, by means of the connecting cable 70, amplifier and recorder etc. the time of generation of the seismic wave at the point 12 can be determined.

In FIG. 2 there is shown a diaphragm 60 separating the water filled space 62 and the explosive gas filled space 58. It is possible to remove the diaphragm 60 and expose the exploding gas mixture directly to the surface of the mud or water. However, it will be preferred to separate the two volumes 58 and 62 by a flexible diaphragm, which can be of a reinforced rubber type material, or thin metal or flexible metal diaphragm, etc.

In FIG. 3 there is illustrated a different form of apparatus corresponding to that in FIG. 2 wherein the diaphragm material separating the liquid in the pipe from the gas mixture, is in the form of a sleeve or boot 80 joining the two ends 77 and 83 of the pipe 20. There is a heavy metal cylindrical chamber 78 surrounding the boot 80 which is fastened by well known means 82 to the ends of the pipes.

As in the case of FIG. 2 there are two valves 56A and 56B arranged for the passage of a combustible gas and an oxygen containing gas so that they can be flowed into the space 89 in proper ratio in order to provide an explosive mixture. This mixture can be detonated by a spark plug or other means 61 supplied with a proper high voltage on line 65. During the explosion, the high pressure gas compresses the boot 80, exerting a shock force on the liquid in the space 76 inside the boot. The shock wave will then travel downward in the pipe 20 as in the case of FIG. 2. The upper end of the pipe 20 will be closed by the valve 50 as was described in connection with FIG. 2. Of course, other embodiments of the explodable gas mixture apparatus can be devised.

Figure 4:
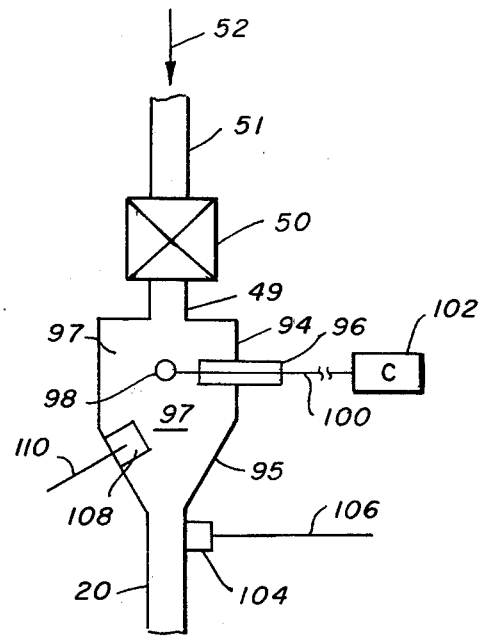
FIG. 4 illustrates a means for generating shock wave in a long pipe by means of an explosion of a solid explosive material.

In FIG. 4 is shown an apparatus similar to that of FIG. 2 in which the explosive material instead of being in the form of a gas is a small volume of explosive material, such as an explosive cap or small volume of dynamite or similar material. This can be detonated by a suitable voltage or current applied to line 100 from a control apparatus 102. This explosive material 98 is positioned in the liquid in the space 97 within the chamber 94 by means of a packing gland 96. With the valve 50 closed, the explosive partical 98 can be detonated by the control means 102 initiating an explosive shock wave in the liquid in a space 97 which travels down the pipe 20 to the mouth 12, etc.

In FIG. 4 is shown a sensor 108 on the inside of the space 97 where it is subjected not only to the initial shock force initiated by the explosive material 98 but where it is in a position to detect an uptraveling shock wave in the liquid 97 initiated by the shock wave at the mouth of the pipe 20. There is also a suitable sensor 104 which may be an accelerometer or similar device attached to the pipe 20. Sensor 104 will sense and generate a signal on line 106 corresponding to the elastic wave which traveled up the pipe 20 from the mouth 12, where it is initiated by the shock wave reaching the mouth of the pipe.

Figure 5:
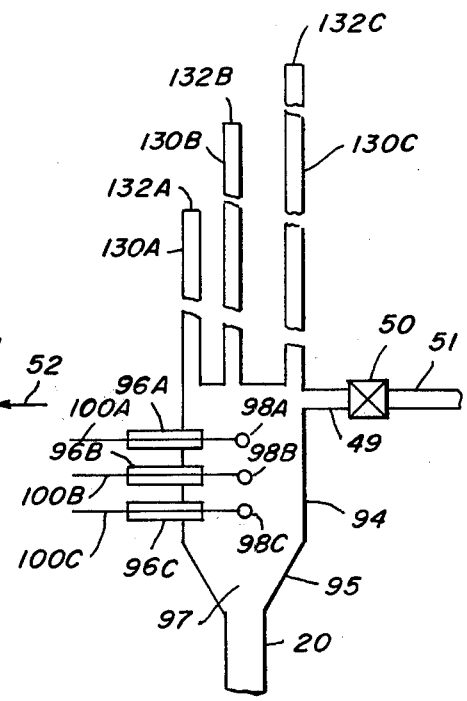
FIG. 5 illustrates apparatus for creating a train of shock wave in liquid in a pipe by means of a plurality of explosive materials.

Referring now to FIG. 5 there is shown a chamber similar to that of FIG. 4, in which a plurality of explosive devices 98A, 98B, 98C, etc. are inserted into the space 97 through appropriate packing glands 96A, 96B, 96C, etc. With the valve 50 closed the explosive devices 98 can be detonated in a selected random time series, so that a composite group of shock waves will travel down the pipe 20 in a selected time pattern. The time pattern can be recorded from the voltages which are applied to the terminals 100A, 100B, 100C, etc. In the final data processing, the received signals at the geophones can be correlated with this time pattern to more precisely determine the travel times of the seismic wave.

FIG. 5 shows also a plurality of long tubes 130A, 130C, etc. each closed on the end by closures 132A, 132B, and 132C, etc. These are of selected different lengths and are openly connected into the chamber 97. With a single explosive device as in FIG. 4 the presence of a plurality of pipes as shown in FIG. 5 will permit shock waves to travel up the pipes from the chamber 97 and be reflected at their termination 132A, 132B, 132C. If these pipes are of selected different lengths, reflected shock waves will be returned to the chamber 97 and will pass down the pipe 20 in a time pattern corresponding to the travel times along the several smaller pipes 130. Thus, by use of separate explosive devices or by use of separate echo channels, such as pipes 130, a plurality of shock wave pulses can be set up in the pipe to create a pattern of shock waves, to better deliniate the arrival of the seismic wave complex at the geophones.

Referring now to FIG. 6 there is shown a chamber 84 similar to that of FIG. 4 in which the water or mud supplied by pipe 51 through valve 50 fills the space 62. An air gun identified by the numeral 67 is inserted in the space 62. The air gun is a commercial piece of apparatus which is used in seismic exploration. It comprises a chamber which can be filled with pressurized air, and a rapidly movable shuttle valve, which, on operation of an electrical control over lead 88 will suddenly cause the shuttle to move and expose ports in the housing through which the compressed air in the chamber can be explosively released from the chamber. This rapidly expanding air exerts an explosive shock force against the liquid in the space 62, creating a shock wave which will travel down the pipe 20. As in the previous cases the valve 15 must be closed prior to the operation of the air gun. The control 90 provides the electrical signal to trigger the air gun which is supplied by air in accordance with the arrow 91. There is a valve 64 by means of which, over control lines 66, a signal can be sent to open the valve 64 and release the pressurized gas in the space 62 to the atmosphere. After the valve 64 is closed and the valve 50 is opened, the mud pump provides a continuing flow of mud or water from the inlet pipe 51 down through the pipe 20.

Figure 7:
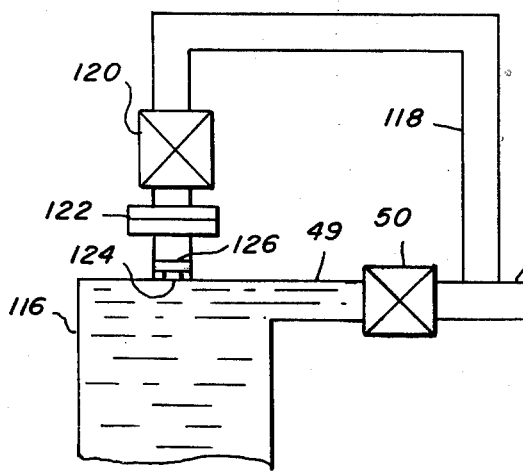
FIG. 7 illustrates apparatus for generating a shock wave in a liquid filled pipe by means of a frangible object.

Referring now to FIG. 7 there is shown another embodiment of this invention in which the shock wave is generated in a chamber 116 by providing a high pressure liquid through pipe 118 and valve 120 to a disc 126 which is sealed across an opening 124 in the chamber 116. This disc 126 is frangible and at a selected pressure of liquid on its top surface, will fracture and explosively permit the pressurized liquid in pipe 118 to expand into the water or mud in the chamber 116 and initiate a shock wave therein.

It will be clear that various configurations of apparatus such as the valve 50 and pipe 49 as well as the valve 120, the coupling 122 and the frangible disc or sheet 126 can be provided. For example, the frangible disc can be a thin sheet of glass metal, plastic or ceramic or other material clamped into the coupling 122. Also it may be advisable to include another valve like 120 between the coupling 122 and the chamber 116. However, the important thing is that with the chamber 116 sealed by closing valve 50 a high pressure liquid flow is suddenly initiated through an opening 124 generating the shock wave.

It is thus seen that many ways are available for generating a shock wave in one end of a long conduit filled with liquid so that the shock wave may pass down the pipe to an open mouth and into a surrounding liquid space where a seismic wave will be generated in the liquid and in the surrounding earth.

While the invention has been described with a certain degree of particularity it degree of manifest that many changes may be made in the details of construction and arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. The method of determining the position in the earth of the bottom of a drill pipe in a deep borehole, the length of the drill pipe being known, said drill pipe is filled and borehole at least partially filled with liquid;
   a. placing a plurality of geophones in the earth in known positions in a selected multi-dimensional array with respect to the expected position of said bottom of said drill pipe, said geophones adapted to detect and transduce seismic waves in the earth to corresponding electrical signals, and amplifying and recording said transduced signals;
   b. near the surface of the earth generating a shock wave in said liquid filled drill pipe and determining the time of generation, whereby said shock wave will travel down to the bottom of said drill pipe and will expand into the liquid in the bottom of said borehole and into the earth in the form of an expanding seismic wave;
   c. recording as a function of time the said amplified transduced signals and determining the times of arrival of said seismic wave at each of said plurality of geophones and
   d. determining the position of said bottom of said drill pipe.

2. The method as in claim 1 including the step of determining from the known time of generation of said shock wave and the known length of drill pipe, the time of initiation of said seismic wave.

3. The method as in claim 1 including the step of recording the reflected shock wave from the bottom of said drill pipe by appropriate sensor at the surface and determining the mean time between the generation of said shock wave and the reception of the reflected shock wave at the surface after travelling up the liquid in said pipe.

4. The method as in claim 1 including the steps of generating in said liquid-filled drill pipe a series of randomly spaced-in-time shock waves, forming a unique time pattern of shock waves and correlating the received seismic waves with this pattern to find the travel time of the seismic waves from the bottom of said pipe to said geophones.

5. The method as in claim 1 including casing in said borehole, and including the additional step of recording at the surface end of said casing the arrival of the elastic wave injected into the casing at the point of emergence of said shock wave from the bottom of the said pipe.

6. The method as in claim 1 including the step of detecting by suitable sensor at the surface, the elastic wave generated in the bottom end of said pipe by the arrival of said shock wave from the surface.

7. The method as in claim 1 in which said borehole is filled with liquid and including the step of detecting by suitable sensor at the surface the elastic waves generated in the liquid in the annulus of the borehole by the arrival of said shock waves from the surface.

8. Apparatus for determining the position in the earth of the bottom of a long pipe in a deep borehole, the length of the pipe being known, said pipe filled and borehole at least partially filled with liquid:
   a. a plurality of earth motion sensors positioned in the earth in known positions in a selected multi-dimensional array with respect to the expected position of said bottom of said pipe, and means to amplify and record the outputs of said sensors;

b. at the surface end of said liquid filled pipe means to generate a shock wave in said liquid, and to record the time of said generation; whereby said shock wave will travel down said pipe to the bottom end thereof and will expand into the liquid in the borehole, and into the earth in the form of an expanding shock wave, which will travel up to the surface and be detected by said sensors and the times of detection recorded; and c. means to determine the time of initiation of said seismic wave, the travel times of said seismic wave to each sensor and the position in the earth of the bottom end of said pipe.

9. The apparatus as in claim 8 including sensor means at the surface to detect the arrival of an elastic wave initiated in the metal of said pipe by the passage of said shock wave out of the bottom of said pipe.

10. The apparatus as in claim 8 including sensor means at the surface to detect the arrival of an elastic wave initiated in the liquid in said pipe by the passage of said shock wave out of the bottom of said pipe.

11. The apparatus as in claim 8 in which said borehole is filled with liquid and including sensor means at the surface to detect the arrival of elastic wave initiated in the liquid in the annulus of said borehole by the passage of said shock wave out of the bottom of said pipe.

12. The apparatus as in claim 8 in which said means to generate said shock wave includes explosive gas means.

13. The apparatus as in claim 8 in which said means to generate said shock wave includes solid explosive means.

14. The apparatus as in claim 8 in which said means to generate said shock wave includes air gun means.

15. The apparatus as in claim 8 in which said means to generate said shock wave includes frangible means.

16. The apparatus as in claim 8 in which said means to generate said shock wave includes means to generate a plurality of time-spaced shock waves and including means to correlate the time pattern of said time spaced shock waves with said recording of the seismic wave arrivals at said sensors.

* * * * *